US005838257A

United States Patent [19]

Lambropoulos

[11] Patent Number: 5,838,257

[45] Date of Patent: Nov. 17, 1998

[54] KEYLESS VEHICLE ENTRY SYSTEM EMPLOYING PORTABLE TRANSCEIVER HAVING LOW POWER CONSUMPTION

[75] Inventor: George P. Lambropoulos, Grosse Pointe Woods, Mich.

[73] Assignee: TRW Inc., Lyndhurst, Ohio

[21] Appl. No.: 653,417

[22] Filed: May 24, 1996

[51] Int. Cl.[6] .......... H04Q 9/14

[52] U.S. Cl. .......... 340/825.54; 340/825.31; 455/38.3; 455/343; 455/574

[58] Field of Search .......... 340/825.54, 825.69, 340/825.72, 825.31; 455/68, 38.3, 127, 343, 574

[56] References Cited

U.S. PATENT DOCUMENTS

| | | | |
|---|---|---|---|
| 4,763,121 | 8/1988 | Tomoda et al. . | |
| 4,794,649 | 12/1988 | Fujiwara | 455/343 X |
| 4,942,393 | 7/1990 | Waraksa et al. . | |
| 5,115,236 | 5/1992 | Kohler | 340/825.69 |
| 5,203,020 | 4/1993 | Sato et al. | 455/68 |
| 5,305,459 | 4/1994 | Rydel | 340/825.69 X |
| 5,319,364 | 6/1994 | Waraksa et al. | 340/825.72 |
| 5,606,739 | 2/1997 | Goto | 455/343 |

*Primary Examiner*—Brian Zimmerman
*Assistant Examiner*—William H. Wilson, Jr.
*Attorney, Agent, or Firm*—Tarolli, Sundheim, Covell, Tummino & Szabo

[57] ABSTRACT

A portable transceiver is provided for use with a remote keyless entry system for controlling the locking-unlocking functions of a motor vehicle door lock and causing performance of a vehicle function. The transceiver includes a signal receiver for, when turned on, receiving an interrogation signal and responding thereto by transmitting a coded reply signal requesting performance of a vehicle function. A power supply is carried by the portable transceiver for purposes of supplying operating power for use by the signal receiver. A timer and controller are arranged to turn-on transceiver operation for a predetermined period of time when an interrogation signal and timed power pulse are received concurrently.

8 Claims, 3 Drawing Sheets

KEYLESS VEHICLE ENTRY SYSTEM EMPLOYING PORTABLE TRANSCEIVER HAVING LOW POWER CONSUMPTION

FIELD OF THE INVENTION

The present invention relates to the art of remote keyless entry systems for controlling the locking and unlocking functions of a vehicle door lock and the like and, more particularly, to a portable transceiver employed in such a system and having low power consumption.

DESCRIPTION OF THE PRIOR ART

Keyless entry systems for motor vehicles are known in the art and typically control the locking and unlocking functions of a motor vehicle door lock. Such a system is disclosed in the U.S. Patent to Tomoda et al. U.S. Pat. No. 4,763,121. That system operates vehicle door locks without the need for any manual operation of pushbuttons located on remote transmitters or the like. Instead, this system includes a vehicle mounted transceiver that automatically and periodically transmits an interrogating demand signal. A portable transceiver carried by an operator may receive the demand signal and respond with a coded reply signal which includes a preset code. The vehicle transceiver has a memory that stores one or more preset codes each of which identifies a portable transceiver which may validly obtain entry into the vehicle. At the vehicle transceiver, the preset code received from the remote transceiver is compared with a prestored preset code and, if a match takes place, the requested control function, such as unlock a vehicle door, is accomplished.

The portable transceiver in the system described above is mounted on a card the size of a typical credit card and which may be kept by an operator in a shirt pocket or wallet or purse, or the like. A particular problem with such a transceiver, sometimes known as an interactive badge, is that power is consumed by a battery-powered receiving circuit in the transceiver while waiting to receive an interrogating demand signal from a vehicle transceiver to which entry is desired. This limits the useful life of the battery and, hence, of the system employing such a transceiver.

It is known in the prior art to provide a remote portable transceiver for use in a keyless vehicle entry system wherein the portable transceiver employs a motion sensor so that battery power is used only at a minimum level so long as the portable transceiver is stationary. Such a system is disclosed in the U.S. Patent to Waraksa et al. U.S. Pat. No. 4,942,393.

In Waraksa et al., the portable transceiver has a transmitter which is activated by the motion sensor, in response to detecting motion, to transmit a coded signal which is received by the vehicle's transceiver to cause a vehicle door to be opened. The vehicle transceiver in Waraksa does not periodically transmit an interrogating demand signal. Some power is always being consumed at a minimum level by Waraksa's circuit in order to monitor the motion sensor even when the transmitter circuit is not turned on. But substantially greater power is consumed when the transmitter is turned on. Each time that motion is sensed, the transmitter is turned on and consumes considerable power from the battery for a period sufficiently long to transmit the coded signal. If this signal is transmitted outside the range of reception of the vehicle transceiver, then power is consumed for no practical purpose.

SUMMARY OF THE INVENTION

The present invention contemplates the provision of a remote entry system for controlling the locking-unlocking functions of a motor vehicle door lock wherein the system includes a vehicle transceiver for periodically transmitting an interrogation signal and receiving a coded reply signal and responding thereto for causing performance of a vehicle function.

In accordance with one aspect of the present invention, a portable transceiver is provided for use with such a remote keyless entry system and the transceiver includes a transmitter/receiver for, when turned on, receiving an interrogation signal and responding thereto by transmitting a coded reply signal requesting performance of a vehicle function. A power supply is carried by the portable transceiver for purposes of supplying operating power for use by the transmitter/receiver. A timer receives operating power from the power supply for periodically supplying power pulses for turning on the transmitter/receiver for a given period of time corresponding with that of a power pulse.

BRIEF DESCRIPTION OF THE DRAWINGS

The foregoing and other objects of the invention will become more readily apparent from the following description of the preferred embodiment of the invention as taken in conjunction with the accompanying drawings which are a part hereof and wherein.

DESCRIPTION OF PREFERRED EMBODIMENT

Figure 1:
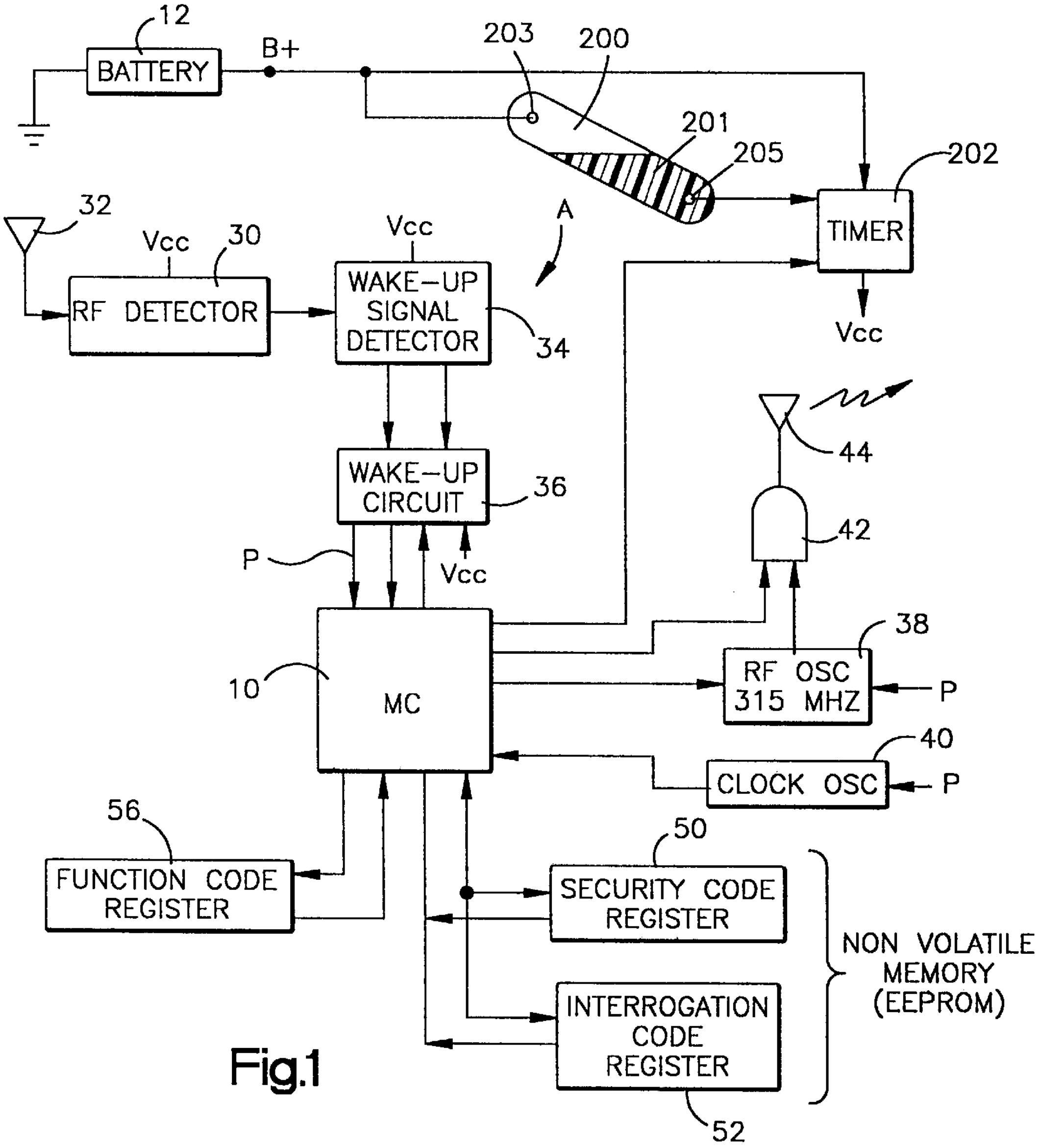
FIG. 1 is a schematic block diagram illustrating a portable transceiver employed in the present invention.

Reference is now made to the drawings wherein the showings are for purposes of illustrating a preferred embodiment of the invention only, and not for the purpose of limiting same. The keyless entry system described herein may include one or more remote, portable interactive transceivers which communicate with a vehicle transceiver to achieve remote control of the vehicle's door lock and unlock mechanisms. The portable transceivers may include transceivers A and B (only the circuitry of transceiver A being described herein in detail). Each takes the form as illustrated with respect to transceiver A in FIG. 1. This portable transceiver, sometimes referred to hereinafter as an interactive badge, may comprise a printed circuit located on a flat plastic base. The transceiver may have an appearance of a typical credit card and may be kept in the operator's purse or wallet or the like. A miniature battery is employed for providing operating power.

Each of the remote transceivers A and B is assigned a security code unique to the particular transceiver. Each vehicle transceiver C is mounted on a vehicle and will permit entry into the vehicle of an operator carrying a transceiver which is coded with a proper security code. In the example being given, transceivers A and B are provided with proper security codes SCA and SCB, respectively, which will permit entry into the vehicle in which is mounted transceiver C. As will be brought out in greater detail below, transceiver C periodically transmits an interrogation signal over a range of approximately two to four meters. The interrogation signal includes an interrogation code that uniquely distinguishes vehicle transceiver C from other vehicle transceivers. If an operator carrying a portable transceiver enters the range of operation of transceiver C, then the interrogation signal will be received by the transceiver.

Assume that an interrogation signal has been received by transceiver A. At transceiver A, the received interrogation code is compared with a prestored interrogation code and, if a match takes place, then transceiver A sends a reply signal back to the vehicle transceiver C. This reply signal includes a security code that uniquely identifies transceiver A, distinguishing it from all other similar transceivers, together with a function code requesting a function, such as the unlocking or opening of the vehicle door. This reply signal is received at the vehicle transceiver C where the received security code is compared with a prestored security code to ensure that the reply is from an access-authorized transceiver. If the received and prestored security codes match, then transceiver C responds to the function code by performing the requested functions, such as unlocking the vehicle door.

Having briefly described the operation of the keyless entry system, attention is now directed to the following more detailed description of a portable transceiver and a vehicle transceiver constructed in accordance with the present invention.

Portable Transceiver

Each portable transceiver takes the form of transceiver A as illustrated in FIG. 1. Transceiver A includes a microcomputer 10 having appropriate internal PROMs, EEPROMS, and RAMs programmed to perform the functions of the system, as hereinafter described, and having sufficient I/O terminals for interconnection with input and output peripherals. A battery 12 which may take the form of a long life miniature battery, such a lithium battery, provides a DC voltage to the various circuits shown in FIG. 1.

The microcomputer also includes a number of internal registers which are used during program execution for storage and manipulation of data and instructions. Individual storage locations in RAM or EEPROM are also sometimes used as such registers. Whereas these registers are internal of the microcomputer 10, several of the registers are illustrated in FIG. 1 external to the microprocessor to assist in the explanation of the invention. The illustrated registers include a security code register 50 and an interrogation code register 52, both of which are preferably located in the EEPROM memory. An additional register illustrated in FIG. 1 is function code register 56. Register 56 is preferably located in RAM. The security code register 50 contains a code which uniquely identifies transceiver A. The security code is fixed in the security code register 50 by the manufacturer. This may be accomplished in the manner described in U.S. Pat. No. 4,881,148. The security code preferably takes the form of four eight bit bytes. The security code is generated at the point of manufacture by means of an algorithm which has the capability of generating numbers in a random, but not repeatable, fashion. Thus, each security code is unique.

The interrogation code register 52 contains a code which is twenty bits in length and provides an identification that uniquely distinguishes the vehicle transceiver C from other, similar vehicle transceivers.

The function code register 56 serves to temporarily store the function code to be transmitted as part of the transmitted signal from the transceiver A to the vehicle transceiver C. The function code is an eight bit byte wherein each bit corresponds to a particular function which may be requested, such as unlocking of the vehicle door. Other types of function coding may of course be used, such as inputs from manual buttons or switches.

Figure 3:
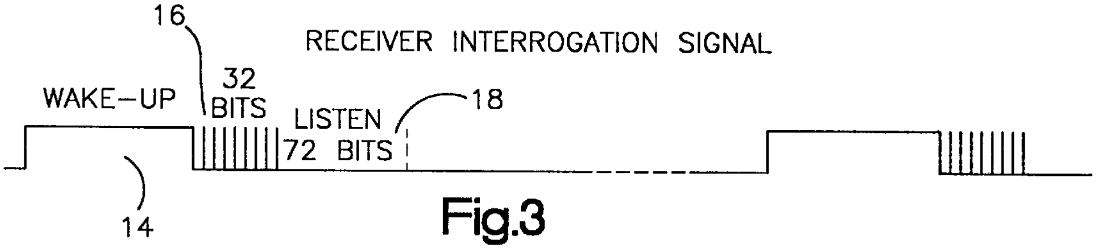
FIG. 3 is an illustration of voltage with respect to time illustrating the waveform of an interrogation signal transmitted by the vehicle transceiver.

As will be discussed in greater detail hereinafter, the vehicle transceiver C (FIG. 2) periodically transmits a radio frequency (RF) interrogation signal over a range on the order of two to four meters from the vehicle. The RF interrogation signal is an RF carrier signal which is keyed by a baseband digital interrogation signal having a pattern as shown in FIG. 3. In FIG. 3, a signal “high” level indicates that the RF carrier signal is keyed “on” and a “low” level indicates that the RF carrier signal is keyed “off”. As shown in the waveform of FIG. 3, the digital control signal includes a wake-up portion 14, an interrogation portion 16 and a listen portion 18. The RF interrogation signal has a duration on the order of 355 milliseconds and is repeated every 1.95 seconds. The wake-up portion 14 is simply the carrier signal modulated at the baud rate but without any data carried thereon. The wake-up portion 14 serves to wake up the receiving portable transceiver, such as transceiver A.

The wake-up portion, which may have a duration on the order of 303 milliseconds, is followed by 32 bits of information transmitted over an interval on the order of 16 milliseconds. This 32 bits of information includes 20 bits of vehicle identification information followed by a four bit request code identifying the type of request being transmitted. This may be followed by a checksum code for purposes of providing verification of the accuracy of the transmitted signal, in a known manner.

The transceiver A includes an RF detector 30 which is tuned to the carrier frequency of the RF interrogation signal transmitted by the transceiver C. The carrier frequency is on the order of 315 MHz. As the interrogation signal is received at the transceiver's receiving antenna 32, the detector 30 demodulates the signal to recover the baseband digital interrogation signal, and passes the recovered signal to a wake-up signal detector 34. The wake-up signal detector 34 checks to see if the BAUD rate is proper, and if so, it activates a wake-up circuit 36 for supplying power P to the transceiver's microcomputer 10 as well as to oscillators 38 and 40.

The data in the recovered interrogation signal (FIG. 3) is clocked into the microcomputer 10. The data includes the 32 bit interrogation portion 16 which, as discussed hereinbefore, includes twenty vehicle identification bits. After the full 32 bits are received and stored in a register in the microprocessor, the microprocessor compares the interrogation or identification code with the code stored in the interrogation code register 52. If a match occurs then, under program control, the transceiver A transmits a badge reply signal (see FIG. 4).

The carrier oscillator 38 has a nominal frequency of 315 MHz and is employed for transmitting the reply signal from the remote transceiver A back to the vehicle transceiver C, as will be discussed in detail hereinafter. other carrier frequencies can be used as required, i.e., 433.92 MHz for Europe. This is under the control of the microcomputer 10. The reply signal (see FIG. 4) includes coded information in the form of binary 1 and binary 0 signals which are superimposed on the 315 MHz carrier signal. The carrier signal supplied by oscillator 38 is modulated by gating it through AND gate 42. The modulated signal is coupled to a transmitting antenna 44 for broadcast. The reply signal transmitted by the transceiver A has a range on the order of two to four meters.

Figure 4:
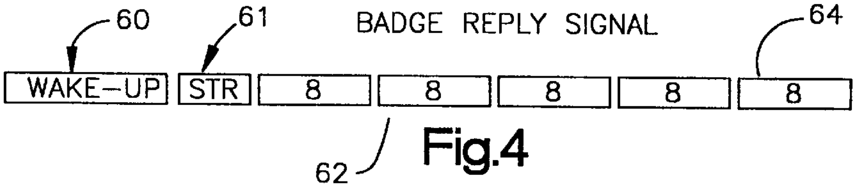
FIG. 4 is an illustration of a coded reply signal transmitted by a portable transceiver.

The badge reply signal, as shown in FIG. 4, includes a wake-up portion 60, a start portion 61 (four bits), a security code portion 62 (four eight bit bytes) and a function code portion 64 (eight bits). Additional bits may be employed in some applications, such as a rolling code application as described in my U.S. Pat. No. 5,442,341 which issued on Aug. 15, 1995. The security code is taken from security code register 50 and the function code from register 56. The function code stored in register 56 will depend upon the four bit request code contained in the interrogation signal. If the request code requests an "open door" reply code, then the function code will be the code which requests unlocking of the doors.

Vehicle Transceiver

The vehicle transceiver C (FIG. 2) includes an RF detector 70 tuned to the reply signal frequency of 315 MHz so that, as the signal is received at the transceiver's receiving antenna 71 during the listening period (FIG. 2), the detector 70 allows the first portion 60 (FIG. 4) to pass to a wake-up signal detector 72 which checks to see if the BAUD rate is proper. If the BAUD rate is proper, detector 72 activates the wake-up circuit 74 which powers-up the circuit by supplying operating voltage $V_{cc}$ such as 5.0 volts, to the transceiver's microcomputer 80. The operating voltage is monitored by a low voltage detector 82 to permit operation of the circuitry so long as the voltage does not drop below a selected level.

The recovered base band data from the received signal is supplied to the microcomputer 80. The microcomputer 80, as in the case of the microcomputer 10 in the transceiver A, includes a plurality of internal memories including PROMs, RAMs, and EEPROMs and a number of internal registers. The microcomputer is programmed to perform the functions to be described in greater detail hereinafter.

Figure 2:
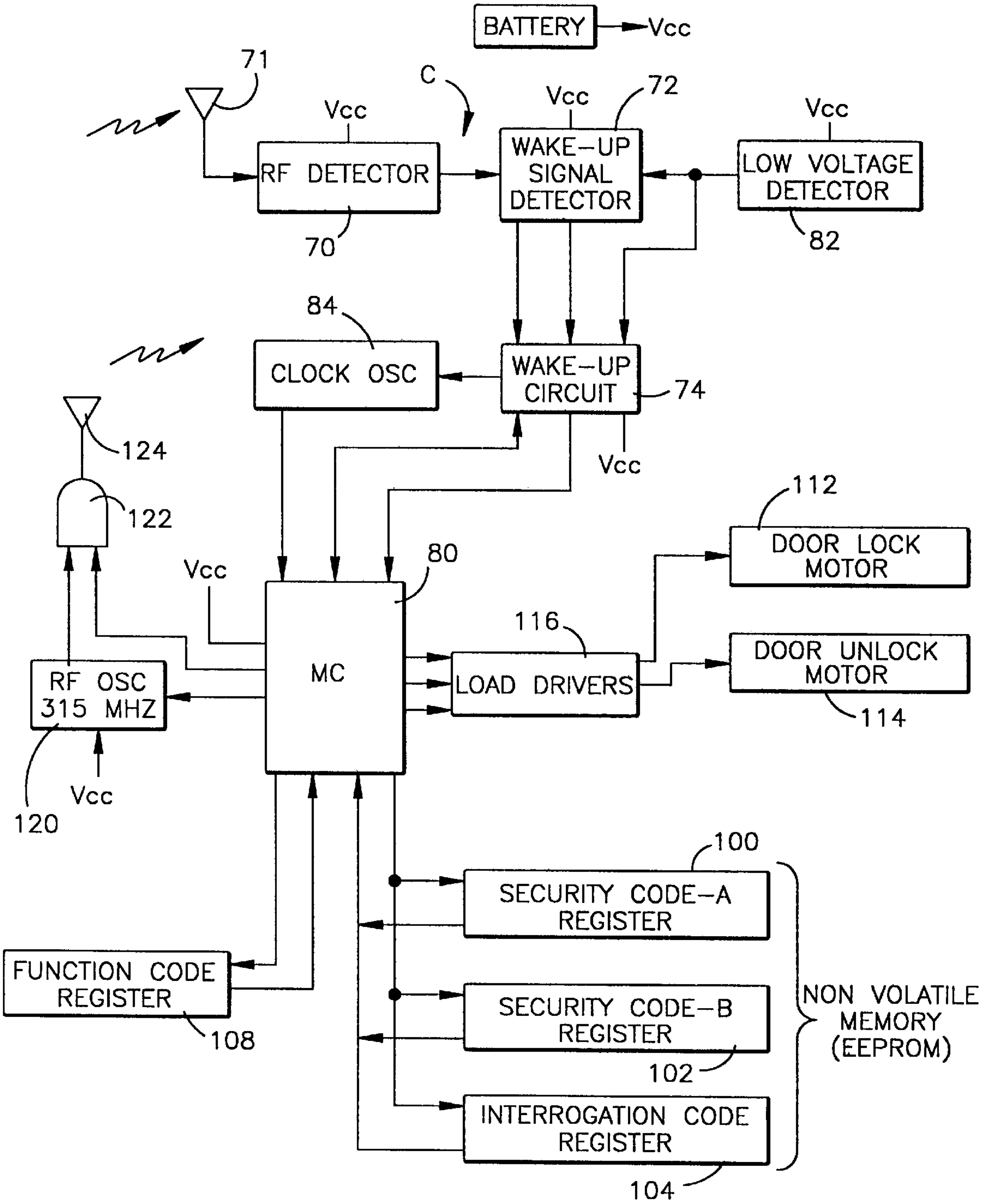
FIG. 2 is a schematic block diagram of a vehicle transceiver in accordance with the present invention.

Some of the internal memory locations of the microcomputer 80 are illustrated in FIG. 2 to assist in the description of the invention. These includes registers 100, 102 and 104, which are all preferably part of the programmable but nonvolatile memory (EEPROM). Register 100 stores a security code identifying a transceiver (e.g., transceiver A) authorized to gain access to the vehicle. The code set into register 100 may be placed in the memory at the factory or may be programmed in the field in the manner described in U.S. Pat. No. 4,881,148. This code is 32 bits in length and is divided into four eight bit data bytes.

As it may be desirable for the vehicle transceiver C to recognize more than one authorized portable transceiver, a second security code register 102 is provided, identical to register 100. Register 102 will store a different security code identifying a second, different, authorized portable transceiver (e.g., transceiver B). An example of an application for security codes assigned to two different portable transceivers is a vehicle having two drivers authorized to use the vehicle. There may be several valid drivers, such as various members of a family unit, and in such case each member carries a different portable transceiver with its own unique security code. At transceiver C, various security code registers (there may be two, as illustrated, or more) each store a security code for a respective one of the authorized portable transceivers.

In addition to the security code registers 100 and 102, the vehicle transceiver C includes an interrogation code register 104 which contains identification data which uniquely identifies the vehicle transceiver C, distinguishing it from similar transceivers mounted in other vehicles. In the example being described, the vehicle identification information is twenty bits in length.

The transceiver C also includes a function code register 108. This register provides temporary storage of the function code portion of the digital signal received from a portable transceiver, such as transceiver A. If transceiver C receives a valid digital signal from transceiver A, then the microcomputer 80 will decode the function code in register 108 and perform a door lock function, such as lock or unlock a vehicle door by way of suitable motors 112 and 114 driven by load drivers 116. This process will now be described in greater detail.

The vehicle transceiver C periodically transmits an interrogation signal as illustrated in FIG. 3. That signal includes data in the form of a series of binary signals, superimposed on a 315 MHz carrier provided by oscillator 120. The carrier signal is modulated by gating it through an AND gate 122 under control of the microcomputer. The resulting amplitude modulated signal is transmitted from the transmitting antenna 124 in a known manner.

Transceiver A receives the interrogation signal processes it in the manner already described and, if the interrogation code received from transceiver C matches that which is prestored at the register 52 in transceiver A, transmits a reply signal back to transceiver C. Upon receipt of the reply signal, transceiver C compares the reply security code with the codes stored in registers 100 and 102. That reply signal includes a function code which is clocked into the microcomputer 80 and stored in the function code register 108. The function code now received as part of the reply signal requests that the vehicle door be unlocked. Thus, when an operator carrying transceiver A enters the range of the interrogation signal transmitted by transceiver C, the doors of the vehicle automatically unlock.

To summarize the process described so far, the transceiver C periodically transmits an interrogation signal, searching for an operator with a valid interactive, portable transceiver and who desires entry into the vehicle. The interrogation signal includes twenty identification bits together with four request code bits which identify sixteen different requests. The request code is now a code which requests that a portable transceiver send a reply code asking for the doors to be unlocked. The transceiver A, in response to the received interrogation signal, transmits a badge reply signal as shown in FIG. 4. That reply signal includes a function code, see function code portion 64 in FIG. 4, which requests that the vehicle door be unlocked. In response thereto, the transceiver C activates the door unlock motor 114 to unlock the vehicle's doors. The operator may now enter into the vehicle.

After the operator has finished using the vehicle and exits therefrom, the transceiver C will revert to its normal operation of automatically and periodically transmitting an interrogation signal (see FIG. 3) which is effective over a range within approximately two meters from the vehicle. As long as a proper reply signal is received, no action is taken by transceiver C. As the operator possessing the transceiver walks away from the vehicle beyond the effective range of the interrogation signal, then no reply signal is sent back to the transceiver C. The microcomputer 80 in the transceiver C responds to the lack of reply by activating the door lock motor 112 to lock the vehicle doors. To prevent the doors from locking, prematurely, due to noise corrupted reply signals, the microcomputer 80 might be programmed to wait until two or three lack of replies take place. The transceiver C will continue to periodically transmit an interrogation signal awaiting a valid reply from a remote transceiver, such as transceivers A and B to allow entry into the vehicle. Following receipt of a valid reply, transceiver C will unlock the doors.

In accordance with the present invention, battery 12 may take the form of a long-life, miniature battery, such as a lithium battery. This provides the DC operating power to various of the circuits as is shown in FIG. 1. Battery life is conserved with the use of a motion sensor 200 and a timer 202. The motion sensor 200 serves to detect physical motion of the transceiver A and it connects the battery 12 to the timer 202. The timer 202, when activated by the motion sensor 200, supplies power pulses $V_{cc}$ to the rest of the circuitry of the transceiver. Each power pulse serves to briefly energize detector 34 and wake-up circuit 36 to check for the existence of an incoming interrogation signal. If an interrogation signal is detected by the detector 30, this is recognized by the microcomputer 10 which is programmed to switch timer 202 from a pulse mode to a continuous mode so that the timer supplies the operating power $V_{cc}$ a sufficient period of time and in a continuous manner to the transceiver circuitry while the interrogation signal is being received, evaluated and responded to and then the timer is returned to the pulse mode.

Figure 5:
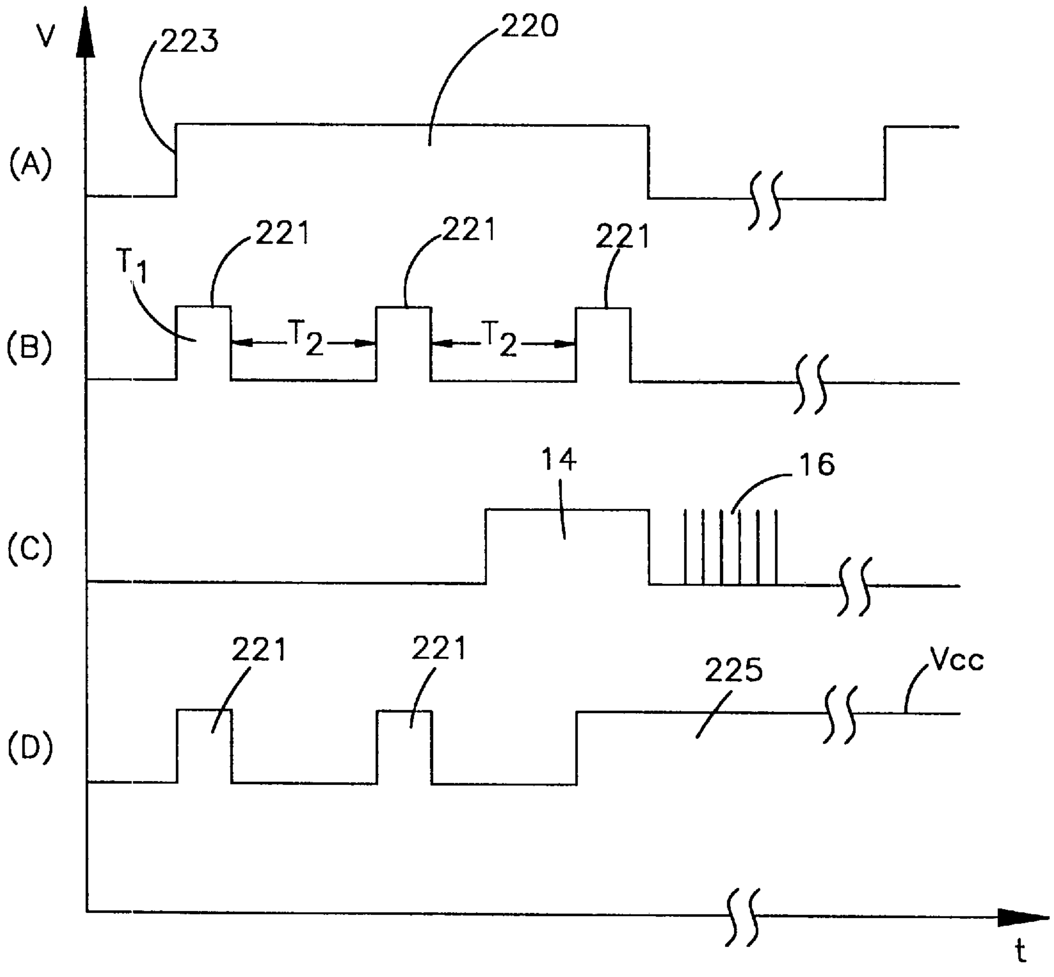
FIG. 5 is an illustration of various curves illustrating the operation of the portable transceiver herein.

Reference is now made to FIG. 5(A) wherein the waveform 220 shows a positive voltage during the period that the motion sensor or switch 200 is closed thereby connecting the battery through the switch 200 to the timer 202. The switch 200 may take the form of a mercury switch including a pool of mercury 201 which serves in a known manner to connect terminals 203 and 205 as the mercury switch is tipped or displaced as the transceiver is moved. The timer 202 supplies $V_{cc}$ power pulses 221 (FIG. 5(B)). The connection between terminals 203 and 205 can be temporary. The timer 202 can be triggered to start supplying power pulses 221 for a preset period of time. The timer 202 is retriggerable. The first of these power pulses 221 is triggered by the leading edge 223 of the waveform 220 when the switch is first closed. Each of the pulses 221 is of short duration $T_1$, which may be on the order of three milliseconds. The power pulses 221 are spaced from each other by a time duration $T_2$, which may be on the order of 300 milliseconds. These pulses 221 will continue at a rate of one pulse every 300 milliseconds so long as switch 200 is closed, or for a predetermined period of time after the switch opens.

Whenever the timer 202 is activated to output a power pulse 221, power voltage $V_{cc}$ is supplied to the RF detector 30, the wake-up signal detector 34 and the wake-up circuit 36. This circuitry is now conditioned to detect and respond to an interrogation signal transmitted by the vehicle transceiver C. That interrogation signal as shown in FIG. 3, includes a wake-up portion 14, a coded identification portion 16 and a listening portion 18. The wake-up portion and the coded identification portion are illustrated in the waveform of FIG. 5(C). The wake-up portion 14, which may occur at any arbitrary time with respect to the power pulses, is shown as taking place during the existence of the third power pulse 221. Upon detection by detector 34 and microcomputer 10, the microcomputer provides a signal to timer 202 which latches it "on" until released by the microcomputer. Thus, the operating voltage $V_{cc}$ becomes continuous at waveform portion 225, shortly after recognition of the wake-up portion 14 of the received interrogation signal. This continuous portion 225 will continue for a fixed time, under control of the microcomputer 10, sufficient to receive the remaining portion of the wake-up portion and the rest of the interrogation signal, see FIG. 3, and then to respond thereto with the badge reply signal shown in FIG. 4. Thus, the time of portion 225 includes at least that for the 32 bits in coded portion 16 and for the time to transmit the badge reply signal during the listening interval 18. At the end of the continuous portion 225, the microcomputer 10 causes the timer 202 to drop out of its continuous mode. Thereafter, the timer 202 is again in its pulse mode of supplying power pulses 221 responsive to motion detector 200, in the manner discussed above.

It is to be noted that during the foregoing operation, the only drain on the battery 12 while waiting for an interrogation signal is the power drawn by the timer 202 for periodically transmitting the power pulses 221 when motion of the portable transceiver is sensed. Each of these power pulses 221 has a time duration on the order of three milliseconds and successive power pulses are spaced by a time duration $T_2$ which is on the order of 300 milliseconds, thus providing a duty cycle of 1/100. In order to assure that a wake-up portion 14 is detected over a period of three milliseconds, the time duration of the "on-time" for the wake-up portion 14 has been chosen so as to equal $T_1$ plus $T_2$, or 303 milliseconds. This relationship between the power pulses and the wake-up portion 14 assures that a wake-up portion will be detected for a period of three milliseconds even if an interrogation signal is received so that its leading edge follows immediately after the lagging edge of one of the power pulses 221.

It is to be further noted that the time duration of a reply signal, as shown in FIG. 4, is substantially longer than that of each of the power pulses 221. Each eight bit byte of the reply signal has a duration on the order of four milliseconds. Consequently, a reply signal is substantially longer than that of the time duration of each power pulse 221. Hence, the power consumed by the circuitry to generate each power pulse is substantially less than that to transmit a badge reply signal.

It has been estimated that with reasonable use, such as thirty operations per day of the portable transceiver that the power consumption will be such that the battery life will be on the order of two years.

From the above description of the invention, those skilled in the art will perceive improvements, changes and modifications. Such improvements, changes and modifications within the skill of the art are intended to be covered by the appended claims.

Having described the invention, I claim the following:

1. A portable transceiver for use in a remote keyless entry system for controlling the locking-unlocking functions of a motor vehicle door lock and wherein said system includes a vehicle transceiver for periodically transmitting an interrogation signal and receiving a coded reply signal and responding thereto for causing performance of a vehicle function, said portable transceiver comprising:

transmitter/receiver means for, when turned on, receiving a said interrogation signal and responding thereto by transmitting a said coded reply signal requesting performance of a vehicle function;

power supply means carried by said portable transceiver for supplying operating power for use by said transmitter/receiver;

timer means for receiving said operating power and having a first mode of operation for periodically supplying power pulses for each turning on said transmitter/receiver means for a given period of time corresponding with that of a said power pulse;

said timer means having a second mode of operation for providing continuous power to said transmitter/receiver means; and control means for controllably switching said timer means between said first and second modes of operation;

said control means including means for switching said timer means from said first mode of operation to said second mode of operation for a predetermined period of time when said transmitter/receiver means concurrently receives a said interrogation signal and a said power pulse so that said transmitter/receiver means is then turned on for said predetermined period of time and wherein said predetermined period of time is of a duration corresponding with that for said transmitter/receiver means to receive said interrogation signal and for transmitting a said coded reply signal.

2. A portable transceiver as set forth in claim 1 wherein each said power pulse is of a time duration less than a said coded reply signal.

3. A portable transceiver as set forth in claim 1 wherein said interrogation signal includes a wake-up portion and an identification portion and said control means controls said timer means to provide said power pulses each having a fixed time duration $T_1$ and wherein successive said power pulses are spaced by a fixed time duration $T_2$ and wherein the sum of said fixed time durations $T_1$ and $T_2$ is equal to the time duration of said wake-up portion of said interrogation signal.

4. A portable transceiver as set forth in claim 1 including motion detecting means for sensing physical motion of said portable transceiver and wherein said timer means is responsive to said motion detecting means for periodically supplying said power pulses.

5. A portable transceiver as set forth in claim 1 combination with a vehicle transceiver, said vehicle transceiver including means for periodically transmitting a said interrogation signal including a wake-up portion and an identification portion and including means for receiving a coded reply signal and responding thereto for causing performance of a vehicle function.

6. The combination as set forth in claim 5 wherein each said power pulse is of a time duration less than a said coded reply signal.

7. The combination as set forth in claim 6 wherein said control means controls said timer means to provide said power pulses each having a fixed time duration $T_1$ and wherein successive said power pulses are spaced by a fixed time duration $T_2$ and wherein the sum of said fixed timed durations $T_1$ and $T_2$ is equal to said wake-up portion of said interrogation signal.

8. The combination as set forth in claim 7 including motion detecting means for sensing physical motion of said portable transceiver and wherein said timer means is responsive to said motion detecting means for periodically supplying said power pulses.

* * * * *